United States Patent Office 2,814,642
Patented Nov. 26, 1957

2,814,642

GAMMA, GAMMA-DIPHENYL-DELTA-OXOCAPROIC ACIDS

Everett M. Schultz, Ambler, Pa., assignor to Merck & Co., Inc., Rahway, N. J., a corporation of New Jersey No Drawing. Application December 17, 1956,
Serial No. 628,577

6 Claims. (Cl. 260—515)

This invention is concerned broadly with new chemical compounds. It is more particularly concerned with gamma,gamma-disubstituted-delta-oxocaproic acids of the general structural formula

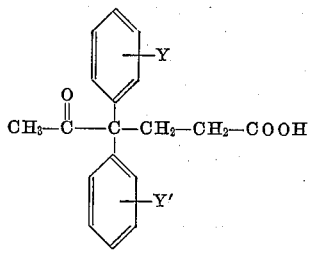

in which Y and Y' respectively are hydrogen, a lower alkyl, halogen, or an alkoxy, advantageously a lower-alkoxy, radical.

The compounds of this invention are prepared conveniently by the hydrolysis of gamma,gamma-disubstituted-delta-oxocapronitriles, the preparation of which compounds is described in U. S. Patent No. 2,703,329 which issued March 1, 1955, on an application filed by myself and entitled, Gamma,Gamma-Disubstituted-Delta-Oxocapronitriles. This hydrolysis is accomplished by refluxing the nitrile in an acidic medium. For example, a mixture of one part concentrated sulfuric acid, one part water, and approximately one and one-half parts glacial acetic acid is a suitable medium for hydrolysis although milder acidic conditions are sometimes indicated. In general, the hydrolysis is accomplished by refluxing the nitrile in the acid medium for approximately two hours, after which the reaction mixture is poured onto ice. The crude acid is separated from the aqueous solution and it is then dissolved in approximately 10% sodium hydroxide solution. The basic solution is extracted with ether or benzene to remove non-acidic materials. Upon the addition of hydrochloric acid to the washed basic solution, the acid precipitates. The acid is further purified by recrystallization from a solvent such as, for example, hexane, ethyl acetate, and the like or it may be distilled.

It will be seen from the foregoing structural formula that some of the compounds of this invention, that is those compounds wherein Y and Y' are different, contain an asymmetric carbon atom in the 4- or gamma-position of the caproic acid chain. Because of the presence of this asymmetric carbon atom in the molecule of these compounds, the racemic modifications of the various products are obtained as the end products of the syntheses described. If desired, the optical isomers can be separated by well known methods, such as by preparing salts in which the dextro and levo modifications have different solubilities. This is conveniently done by preparing the salts of certain optically active bases. While the racemic mixtures exhibit therapeutic properties of the type possessed by these novel compounds, in some instances the activity may be greater in one pure enantiomorph than the other.

The compounds of this invention possess physiological activity for example, being useful to suppress gastric secretion and as antiviral agents. The compounds can be administered orally or parenterally in the form of tablets, capsules, elixirs, sterile solutions and the like. As the dosage of the chemotherapeutic agents will vary over a wide range from pediatric to geriatric and from one clinical indication to another, scored tablets containing from 50 to 250 mgs. of the active ingredient can be made available to the physician for the symptomatic adjustment of dosage to the individual patient. Sterile solutions of the salts in concentrations of 1, 5, 10, 15% or higher also can be made available to the physician for parenteral administration on the same basis.

The invention is illustrated by, but not restricted to the following examples which describe the preparation of compounds falling within the scope of the above general formula:

Example 1.—Gamma,gamma-diphenyl-delta-oxocaproic acid

Gamma,gamma-diphenyl-delta-oxocapronitrile, 90.25 g. (0.343 mole), and a mixture of 134 g. of sulfuric acid, 179 g. water and 342 ml. glacial acetic acid were refluxed together for approximately one and one-quarter hours. The reaction mixture then was poured upon approximately 1500 g. of cracked ice. The gamma,gamma-diphenyl-delta-oxocaproic acid separated as an oil but crystallized as the ice melted. The product was collected by filtration and washed with water. It then was dissolved in 500 ml. 5% sodium hydroxide and this basic solution was washed with approximately 100 ml. of ether. The aqueous solution was acidified with hydrochloric acid and the precipitated crude oxocaproic acid separated by filtration and air dried at approximately 50° C. The yield of crude product was 95 g. (98%), M. P. 131–137° C. Distillation of this material gave 82.7 g., M. P. 135.5–137.5° C. Recrystallization of the distilled product from a mixture af acetic acid (430 ml.) and water (725 ml.) gave gamma,gamma-diphenyl-delta-oxocaproic acid, M. P. 137.5–139° C.

Analysis for $C_{18}H_{18}O_3$: Calculated: C, 76.57; H, 6.42. Found: C, 76.78; H, 6.56.

Example 2.—Gamma-(p-chlorophenyl)-gamma-phenyl-delta-oxocaproic acid

Gamma - (p - chlorophenyl) - gamma - phenyl - delta-oxocapronitrile, 42.2 g. (0.142 mole), was dissolved in a mixture of glacial acetic acid (275 ml.), concentrated sulfuric acid (90 ml.) and water (120 ml.). The mixture was refluxed for 75 minutes then cooled and poured onto ice (1000 g.). The aqueous solution was decanted from the oil which was dissolved in benzene. The benzene solution was extracted thrice with 10% sodium hydroxide solution (100 ml. portions). The combined aqueous extracts were heated to boiling for a few minutes, filtered and acidified with hydrochloric acid. The oily product was extracted twice with benzene (100 ml. portions). The combined extracts were dried over sodium sulfate and the solvent removed by distillation at reduced pressure. The oily product that resulted was induced to solidify by stirring with a mixture of acetic acid and water. The solid was filtered off and dried. The yield was 40 g. (89%). Several recrystallizations from cyclohexane then from acetonitrile gave white crystalline gamma-(p-chlorophenyl)-gamma-phenyl-delta-oxocaproic acid, M. P. 101.5–103° C.

Analysis for $C_{18}H_{17}O_3Cl$: Calculated: C, 68.24; H, 5.41; Cl, 11.19. Found: C, 68.39; H, 5.44; Cl, 11.13.

*Example 3. — Gamma - (p - tolyl) - gamma - phenyl - delta - oxocaproic acid*

Gamma - (p - tolyl) - gamma - phenyl - delta - oxocapronitrile, 25.1 g. (0.09 mole), was dissolved in a mixture of glacial acetic acid (190 ml.), concentrated sulfuric acid (60 ml.) and water (85 ml.). The mixture was refluxed for one hour, then cooled and poured onto ice (750 g.). The resulting oil was extracted in benzene (three 100 ml. portions). The combined benzene extracts were extracted with 10% sodium hydroxide solution (three 75 ml. portions). The combined aqueous solutions were acidified with hydrochloric acid and the oily product extracted three times with benzene (100 ml. portions). The combined extracts were dried over sodium sulfate and the solvent then was removed by evaporation on a steam bath; 25.9 g. (97% yield) of an oil was obtained which soon solidified. Upon recrystallization from heptane and then from acetonitrile, crystalline gamma-(p-tolyl)-gamma-phenyl-delta-oxocaproic acid was obtained, M. P. 113–115° C. (uncorr.).

Analysis for $C_{19}H_{20}O_3$: Calculated: C, 77.00; H, 6.80. Found: C, 77.18; H, 6.90.

*Example 4. — Gamma - (m - methoxyphenyl) - gamma - phenyl - delta - oxocaproic acid*

Gamma - (m - methoxyphenyl) - gamma - phenyl - delta - oxocapronitrile, 32.2 g. (0.11 mole), was dissolved in a mixture of glacial acetic acid (160 ml.), concentrated sulfuric acid (55 ml.) and water (55 ml.). The mixture was refluxed for an hour, cooled and poured onto crushed ice (700 g.). The oil which separated was extracted with benzene and the extract washed with water and dried over sodium sulfate. The solvent was removed by distillation at reduced pressure. Upon cooling the product, gamma - (m - methoxyphenyl) - gamma - phenyl - delta - oxocaproic acid, separated.

*Example 5. — Gamma - (o - chlorophenyl) - gamma - phenyl - delta - oxocaproic acid*

Step A.—In a 2-liter, 3-necked flask, equipped with a mechanical stirrer, dropping funnel and reflux condenser capped with a drying tube, was placed 1-(o-chlorophenyl)-2-propanone (217.2 g., 1.29 mole) and dry benzene (805 ml.). The solution was stirred and bromine (206.1 g., 1.29 mole) was added, dropwise, over a period of 30 minutes. After addition was complete dry nitrogen was bubbled through the solution for 2 hours to remove as much hydrogen bromide as possible by entrainment.

A 3-liter, 3-necked flask was equipped with a mechanical stirrer, dropping funnel and a reflux condenser capped with a drying tube. The flask was charged with aluminum chloride (343.9 g., 2.58 mole) and dry benzene (805 ml.). This mixture was stirred and refluxed. The bromination mixture prepared earlier then was added, dropwise, over a period of one hour. After refluxing for another hour the mixture was allowed to cool and stand at room temperature overnight.

The reaction mixture was poured with stirring into a mixture of crushed ice (2500 g.) and concentrated hydrochloric acid (480 ml.). The organic layer was separated and the aqueous layer was extracted twice with ether (400 ml. portions). The organic extracts were combined and washed with water (300 ml.), then 5% sodium hydroxide (300 ml.) and finally with water (300 ml.).

The solution was dried over sodium sulfate and the solvent distilled at reduced pressure. The residue was fractionally distilled. The yield of material boiling at 138–148° C., 0.15 mm., was 187.2 g. (59%). The distillate solidified on standing. Recrystallization several times from petroleum ether gave 1-(o-chlorophenyl)-1-phenyl-2-propanone as a white crystalline product, M. P. 62–65° C.

Analysis for $C_{15}H_{13}OCl$: Calculated: C, 73.62; H, 5.36. Found: C, 73.44; H, 5.58.

The 2,4-dinitrophenylhydrazone derivative melted at 134–135.5° C.

Step B.—A 2-liter, 4-necked flask was equipped with a mechanical stirrer, thermometer, dropping funnel and reflux condenser which was capped with a drying tube. 1-(o-chlorophenyl)-1-phenyl-2-propanone (187.2 g., 0.765 mole) was placed in the flask and dissolved in dry acetonitrile (500 ml.). Acrylonitrile (40.5 g., 0.765 mole) and benzyltrimethylammonium hydroxide (17 ml. of 40% aqueous solution) was added. The mixture was vigorously stirred for 2 hours during which the temperature rose from 27° to 36° C. In order to maintain a pH of 11, powdered potassium hydroxide (1.5 g.) was added during this period.

During the next 3½ hours the temperature was raised slowly to 60° C. and acrylonitrile (40.5 g., 0.765 mole) added dropwise. In order to maintain a pH of 11, benzyltrimethylammonium hydroxide (5 ml. of 40% aqueous solution) and powdered potassium hydroxide (3.5 g.) were added at 30 minute intervals.

Finally the solution was cooled to room temperature, benzyltrimethylammonium hydroxide solution (1 ml.) and powdered potassium hydroxide (0.5 g.) were added and the mixture stirred for an additional 16 hours.

The solution then was neutralized with aqueous sulfuric acid and the solvent distilled off at reduced pressure. The residue was dissolved in benzene (500 ml.) and washed three times with water (150 ml. portions). The benzene solution was dried over anhydrous sodium sulfate and the solvent again removed by distillation at reduced pressure. Fractional distillation of the residue gave 159.6 g. (70%) of material boiling at 183–185° C., 0.5 mm. The product which solidified on standing was recrystallized several times from isopropyl alcohol yielding gamma - (o - chlorophenyl) - gamma - phenyl - delta - oxocapronitrile, a white crystalline solid, M. P. 90.5–92.5° C. (uncorr.).

Analysis for $C_{18}H_{16}ONCl$: Calculated: C, 72.60; H, 5.42; N, 4.70. Found: C, 72.63; H, 5.63; N, 4.71.

Step C. — Gamma - (o - chlorophenyl) - gamma - phenyl - delta - oxocapronitrile (17.1 g., 0.574 mole) was added to a mixture of glacial acetic acid (110 ml.), water (45 ml.) and concentrated sulfuric acid (35 ml.) in a flask equipped with a reflux condenser. The solid dissolved upon heating the mixture to the boiling point. The solution was refluxed for one hour after which a sample of the reaction mixture was completely soluble in excess alkali. The solution was cooled and poured onto ice (500 g.).

The solid that separated was removed by filtration and redissolved by adding aqueous sodium hydroxide to a suspension of the solid in water. The product was reprecipitated by acidification with excess hydrochloric acid. The solid was extracted with ether and the ether dried over sodium sulfate. Evaporation of the solvent gave an oil which solidified upon addition of a small amount of acetonitrile. The yield of product was 16.3 g. (90%), M. P. 130–134° C. Recrystallization first from acetonitrile then from a mixture of acetic acid and water gave gamma-(o-chlorophenyl)-gamma-phenyl-delta-oxocaproic acid, melting at 132–134° C. (Uncorr.).

Analysis for $C_{18}H_{17}O_3Cl$: Calculated: C, 68.24; H, 5.41; Cl, 11.19. Found: C, 68.18; H, 5.64; Cl, 10.99.

The additional compounds falling within the scope of the general formula in column 1 are prepared by following substantially the same procedures described in Examples 1 through 5. Thus, by replacing the gamma-(p - chlorophenyl) - gamma - phenyl - delta - oxocapronitrile employed in Example 2 by an equimolecular quantity of gamma - (p - bromophenyl) - gamma - phenyl-delta - oxocapronitrile, there is obtained gamma - (p-bromophenyl) - gamma - phenyl - delta - oxocaproic acid. Similarly, when gamma - (m - chlorophenyl) - gamma-phenyl - delta - oxocapronitrile is substituted in an equimolecular quantity for the gamma - (p - chloro - phenyl)-gamma - phenyl - delta - oxocapronitrile employed in Example 2, there is obtained the gamma - (m - chlorophenyl) - gamma - phenyl - delta - oxocaproic acid.

By replacing the gamma - (p - tolyl) - gamma - phenyl-delta - oxocapronitrile of Example 3 by an equimolecular quantity of gamma - (p - ethylphenyl) - gamma - phenyl-delta - oxocapronitrile, there is obtained the corresponding gamma - (p - ethylphenyl) - gamma - phenyl - delta-oxocaproic acid.

Other halogen-substituted phenyl or alkyl-substituted phenyl derivatives can be prepared by making a similar change in the intermediates used in Examples 2, 3, and 5. For example, by substituting the gamma - (p - chlorophenyl) - gamma - phenyl - delta - oxocapronitrile of Example 2 by an equimolecular quantity of gamma,-gamma - di - (p - chlorophenyl) - delta - oxocapronitrile or gamma,gamma - di - (p - tolyl) - delta - oxocapronitrile, there is obtained respectively gamma,gamma - di-(p - chlorophenyl) - delta - oxocaproic acid and gamma,-gamma - di - (p - tolyl) - delta - oxocaproic acid.

*Example 6.—Resolution of gamma-(o-chlorophenyl)-gamma-phenyl-delta-oxocaproic acid*

Step A.—Levo form.—Racemic gamma - (o - chlorophenyl) - gamma - phenyl - delta - oxocaproic acid (50 g., 0.158 mole) and cinchonine (46.5 g., 0.158 mole) was dissolved in 95% ethanol (250 ml.). The solution was seeded and refrigerated for 24 hours. The solid that separated, 33.1 g., was filtered off and dried. The mother liquor was concentrated to 200 ml. and refrigerated for a week whereby another 6.7 g. separated to bring the total to 39.8 g. The filtrate was concentrated to a volume of 150 ml., seeded and refrigerated for a month. Another 2 g. of solid separated. This material was removed by filtration and discarded. The mother liquor was set aside for isolation of the dextro acid. (This will be referred to as mother liquor I, in step B below.)

The 39.8 g. of combined products were recrystallized from 95% ethanol (250 ml.) with refrigeration for 16 hours. The yield was 28.8 g. Recrystallization from 95% ethanol (140 ml.), refrigerating for 40 hours, gave 23 g., M. P., 171–172° C. After two more recrystallizations from 95% ethanol, 16.1 g. of material remained which had the same M. P. This cinchonine salt gave the following analysis for $C_{18}H_{17}O_3Cl:C_{19}H_{22}ON_2$.

Analysis: Calculated: C, 72.71; H, 6.43; N, 4.58. Found: C, 73.01; H, 6.49; N, 4.54.

The above cinchonine salt (15.85 g., 0.0259 mole) was suspended in water and acidified with excess hydrochloric acid. The liberated carboxylic acid was extracted twice with benzene. The benzene extracts were combined and washed with water. The benzene solution was extracted twice with dilute sodium hydroxide solution. The combined alkaline extracts were treated with excess hydrochloric acid and then extracted twice with benzene and the combined extracts washed with water and dried over sodium sulfate.

Evaporation of the benzene gave 8.2 g. of the levo acid. After three recrystallizations from a mixture of benzene (6 ml.) and cyclohexane (75 ml.), 6.93 g. remained; M. P., 125.5–126.5° C. (corr). The $[\alpha]_D^{25}$ for a 1% solution in 95% ethanol was —59°.

Analysis for $C_{18}H_{17}O_3Cl$: Calculated: C, 68.24; H, 5.41. Found: C, 68.19; H, 5.43.

Step B.—Dextro form.—Mother liquor I, containing the dextro acid-cinchonine salt, was evaporated at reduced pressure. The glass-like product was dissolved in acetonitrile and the insoluble impurities filtered off and discarded. The filtrate was evaporated at reduced pressure. The residue was treated with water and an excess of dilute hydrochloric acid was added. The liberated carboxylic acid that separated on stirring and warming was extracted twice with benzene. After washing with water, the combined benzene extracts were dried over sodium sulfate.

Evaporation of the benzene gave 28.3 g. of product A. Recrystallization of this product from a mixture of cyclohexane (275 ml.) and benzene (60 ml.) gave 16.73 g. of product B which is richer in racemic compound. Recrystallization of B from acetonitrile (50 ml.) gave C, 9.8 g., M. P. 131°–132° C. (This is nearly pure racemic material.)

Concentrating and cooling the mother liquors from A gave 8.7 g., M. P. 121°–122° C. Evaporation of the mother liquors from B gave 5.2 g., M. P. 120°–122° C. Combination of these materials gave 13.9 g. which was recrystallized twice from a mixture of cyclohexane (125 ml.) and benzene (15 ml.). The yield of the dextro acid was 11.0 g., M. P. 124.5°–125.5° C. The $[\alpha]_D^{25}$ of a 1% solution in 95% ethanol was +59°.

Analysis for $C_{18}H_{17}O_3Cl$: Calculated: C, 68.24; H, 5.41. Found: C, 68.54; H, 5.53.

While the invention has been illustrated by certain particular gamma,gamma-disubstituted-delta-oxocaproic acids and certain specific methods for preparing these compounds, as well as suggested dosage forms for the administration of the compounds, it is to be understood the invention contemplates their equivalents and is limited solely by the scope of the appended claims.

This application is a continuation-in-part of United States patent application Serial No. 305,691, filed August 21, 1952, now abandoned, which, in turn, is a continuation-in-part of United States patent application Serial No. 179,898, filed August 16, 1950, now abandoned.

What is claimed is:

1. A compound of the general structural formula

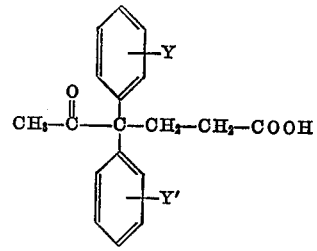

wherein Y and Y' respectively is a member of the group consisting of hydrogen, a lower-alkyl, halogen, and lower-alkoxy radicals.

2. Gamma,gamma-diphenyl-delta-oxocaproic acid.

3. Gamma-(p-chlorophenyl) - gamma - phenyl - delta-oxocaproic acid.

4. Gamma-(p-tolyl)-gamma - phenyl-delta-oxocaproic acid.

5. Gamma-(o-chlorophenyl)-gamma-phenyl-delta-oxocaproic acid.

6. Levo gamma - (o - chlorophenyl) - gamma - phenyl-delta-oxocaproic acid.

No references cited.